(12) United States Patent
Nishikawa et al.

(10) Patent No.: US 7,035,426 B2
(45) Date of Patent: Apr. 25, 2006

(54) IMAGE PROCESSING APPARATUS, IMAGE PROCESSING METHOD AND A COMPUTER PROGRAM PRODUCT FOR JUDGING WHETHER IMAGE DATA INCLUDE SPECIFIC INFORMATION RELATED TO COPY PROTECTION

(75) Inventors: Hiromitsu Nishikawa, Kanagawa (JP); Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1150 days.

(21) Appl. No.: 09/774,040

(22) Filed: Jan. 31, 2001

(65) Prior Publication Data

US 2002/0012444 A1    Jan. 31, 2002

(30) Foreign Application Priority Data

Jan. 31, 2000    (JP) .............................. 2000/021560

(51) Int. Cl.
*G06K 9/00*    (2006.01)

(52) U.S. Cl. ..................................... 382/100
(58) Field of Classification Search ................ 382/100, 382/227; 380/201; 283/902; 399/366; 386/94; 705/57, 58
See application file for complete search history.

(56) References Cited

U.S. PATENT DOCUMENTS

| 5,430,525 | A | * | 7/1995 | Ohta et al. ................... 399/366 |
| 5,561,534 | A | | 10/1996 | Ishida et al. ................. 358/488 |
| 5,694,486 | A | | 12/1997 | Shigeeda et al. ............ 382/197 |
| 5,748,777 | A | | 5/1998 | Katayama et al. .......... 382/199 |
| 5,757,961 | A | | 5/1998 | Yamakawa et al. ......... 382/197 |
| 5,828,794 | A | | 10/1998 | Katayama et al. .......... 382/298 |
| 5,845,008 | A | * | 12/1998 | Katoh et al. ................. 382/217 |
| 5,933,528 | A | | 8/1999 | Katayama et al. .......... 382/197 |
| 6,037,925 | A | * | 3/2000 | Kim ............................. 345/99 |
| 6,111,994 | A | | 8/2000 | Katayama et al. .......... 382/298 |
| 6,449,386 | B1 | * | 9/2002 | Nakao ......................... 382/144 |
| 6,741,758 | B1 | * | 5/2004 | Hayashi et al. ............. 382/294 |

* cited by examiner

*Primary Examiner*—Brian Werner
*Assistant Examiner*—Christopher Lavin
(74) *Attorney, Agent, or Firm*—Fitzpatrick, Cella, Harper & Scinto

(57) ABSTRACT

The present invention relates to image processing in which an image resolution of input image data is compared to information of predetermined standard resolution, and the image data is judged to determine whether it includes specific information related to copy protection. Whether or not to perform judging is controlled based on the result of the comparison. Because the control technique of the present invention controls whether or not to perform the judgment based on the result of the c comparison, the control technique according to the invention provides an efficient judging processing, since no judgment is performed on low resolution image data which is not prone to counterfeiting.

52 Claims, 11 Drawing Sheets

IMAGE PROCESSING APPARATUS, IMAGE PROCESSING METHOD AND A COMPUTER PROGRAM PRODUCT FOR JUDGING WHETHER IMAGE DATA INCLUDE SPECIFIC INFORMATION RELATED TO COPY PROTECTION

BACKGROUND OF THE INVENTION

1. Field of the Invention

This invention relates to an image processing apparatus, an image processing method and a computer program product for judging whether image data include specific information related to copy protection.

2. Description of the Related Art

In connection with color copying machines, implementing an image recognition processing function to prevent counterfeiting of a copy-prohibited object, such as a banknote or valuable securities has been considered. One drawback of color copying machines is that they are expensive stand-alone devices. More recently, high quality copying has been attained using less expensive computers, computer peripheral apparatuses such as a color scanner and a color printer, and image processing software to edit an input and output image. A need has developed for using an image recognition processing function to prevent counterfeiting of a banknote and valuable securities for an inexpensive color image processing system using a color scanner and printer.

There are some known judging methods for judging whether an original is a copy-prohibited object or not. An original is judged based on a color spectrum distribution of image data (R,G,B data for each pixel) generated by scanning the original, and a comparison of the color spectrum distribution with copy-prohibited object data stored in a ROM, or based on a comparison of an image pattern of a part of the original(or the entire original) with a copy-prohibited object pattern stored in a ROM. The result of the judging is an evaluation value as to whether the original is a copy-prohibited object or not.

It is recently possible to make a copy-prohibited object by using a technology called digital watermark. The copy-prohibited object is altered to include information indicating whether the object is a copy-prohibited object. The process of making the copy-prohibited object is as follows. First, second digital information (sub-information) indicating that the object is copy-prohibited is attached to digital image data as the first digital information (main-information). Next, a printed document is made from the digital image data including the attached second information. Of course, the second digital information indicating that the object is copy-prohibited can be detected from the digital image data as a characteristic of the digital watermark. It is possible to detect the second digital information indicating that the object is copy-prohibited from newly-created image data which is created from the printed document by an image reading apparatus (e.g., a color scanner). This technology is called digital watermark and is increasingly used for prohibiting illegal copying of printed material.

In view of widespread use of computer peripherals to make color copies, a judging process chiefly made of software for a copy-prohibited object is preferable to a hardware one comprising many electrical circuits. Such a software process, however, uses too much processing power and takes too long to judge whether an image is of a copy-prohibited object or not and to process the image.

SUMMARY OF THE INVENTION

An object of the present invention is to address the above situation.

One particular object of the present invention is to provide an image processing apparatus and method and a computer program product that can avoid unnecessary processing and can provide a faster judgment of whether or not an object is copy-prohibited.

Another object of the present invention is to provide an image processing apparatus and method and a computer program product that have a new function not known before.

According to one aspect, the present invention, which achieves these objectives, relates to image processing in which an image resolution of input image data is compared to information of predetermined standard resolution and the image data is judged to determine whether it includes specific information related to copy protection, wherein whether or not to perform the judging is controlled based on the result of the comparison.

Because the control technique of the present invention controls whether or not to perform the judgment based on the result of the comparison, the control technique according to the invention provides an efficient judging processing, since no judgment is performed on low resolution image data which is not prone to counterfeiting.

The foregoing and still other objects, features and advantages of the present invention will become fully apparent from the following description to be taken in conjunction with the attached drawings.

DESCRIPTION OF THE PREFERRED EMBODIMENTS

Figure 1:
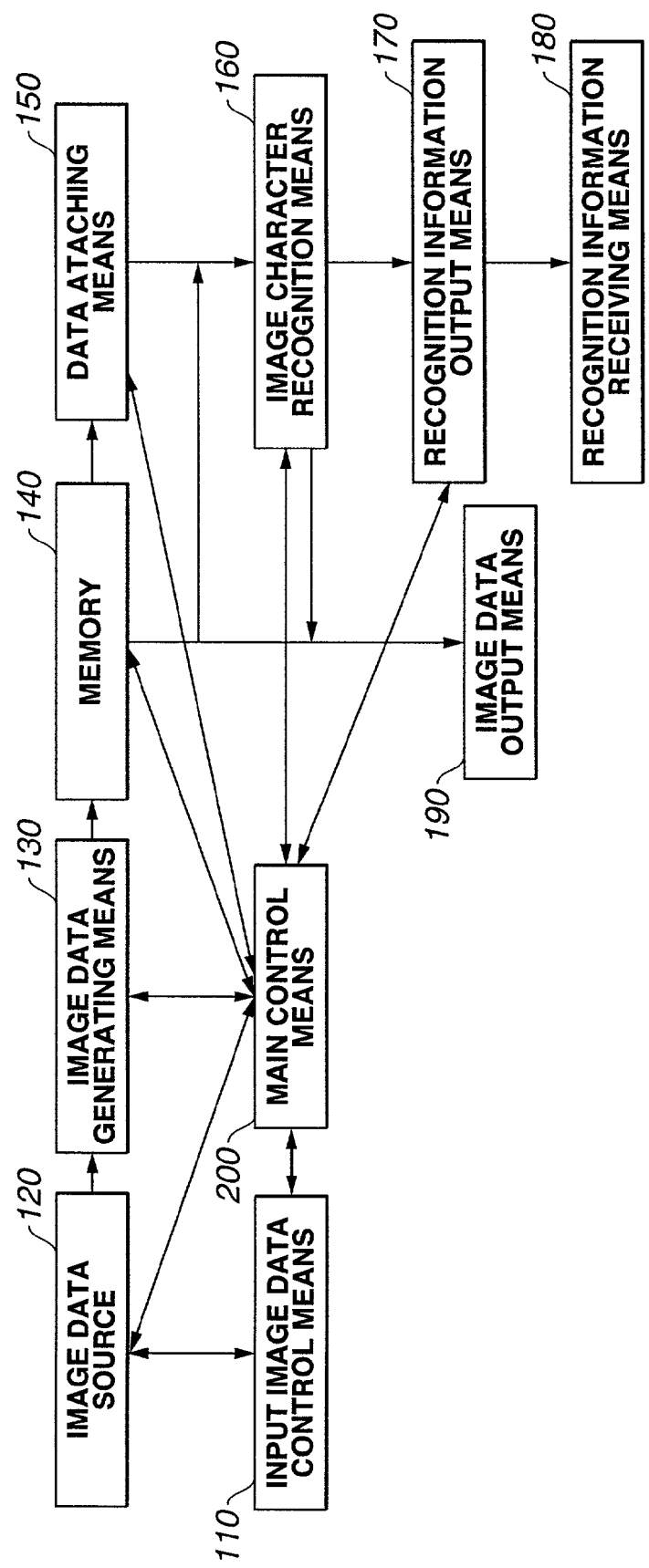
FIG. 1 is a diagram which shows the image processing apparatus of this invention.

FIG. 1 is a block diagram which shows an image processing apparatus of this invention.

Input image data control means 110 controls a resolution of an image which is read by image data source 120 as an image scanner. Image data generating means 130 generates image data of an image resolution which is controlled by input image data control means 110. Memory 140 stores the image data generated by image data generating means 130.

Data attaching means 150, which is controlled by main control means 200 based on the image resolution controlled by input image data control means 110, attaches digital data to the image data stored in memory 140. Image character recognition means 160, which is controlled by main control means 200 based on the image resolution controlled by input image data control means 110, judges whether the image data stored in memory 140 belongs to a copy-prohibited object.

Recognition information output means 170 outputs a recognition result of the image character recognition means 160. Recognition information receiving means 180 displays the recognition result on a display or the like, and receives the recognition result information and informs the image processing apparatus's user that an original based on said image data is a copy-prohibited object. Image data output means 190 outputs sequentially an output image.

Each function block in FIG. 1 has the following description. Image data generating means 130 generates image data of a resolution which is indicated from an indicating means (unshown) of input image data control means 110 and is based on a preset image on image data source 120 and an indication by a user of the image processing apparatus. Information of the image resolution indicated by a user of the image processing apparatus is output to main control means 200 at the same time. Main control means 200 controls data attaching means 150, image character recognition means 160 and recognition information output means 170 based on the information of the image resolution output from input image data control means 110.

The First Embodiment

Information indicating that an object is copy-prohibited is attached to an original by using a technology called digital watermark in one preferable embodiment of this invention.

An original of the copy-prohibited object is formed by printing the image data with the attached information indicating that the object is copy-prohibited. The digital image data, with its attached information indicating that the object is copy-prohibited, is made by attaching second digital information indicating that the object is copy-prohibited to the first digital information which is a source of the printing object. The digital watermark may be any kind of digital watermark, such as one attached to a specific frequency of image information as invisible information or visible information that is difficult for human eyes to see, like yellow dots.

In an inexpensive color scanner or printer, it is preferable to carry out counterfeit prevention of a copy-prohibited object less expensively than in a comparatively expensive color copying machine as stated above. It is an effective answer to judge the copy-prohibited object by using a software process, but the software judging process has a problem related to processing speed. Accordingly, the present invention checks the possibility of whether a printing image based on an original could be used as a counterfeit, in accordance with image resolution. The possibility is the degree of risk that someone would mistake the counterfeit for a genuine one.

Figure 2:
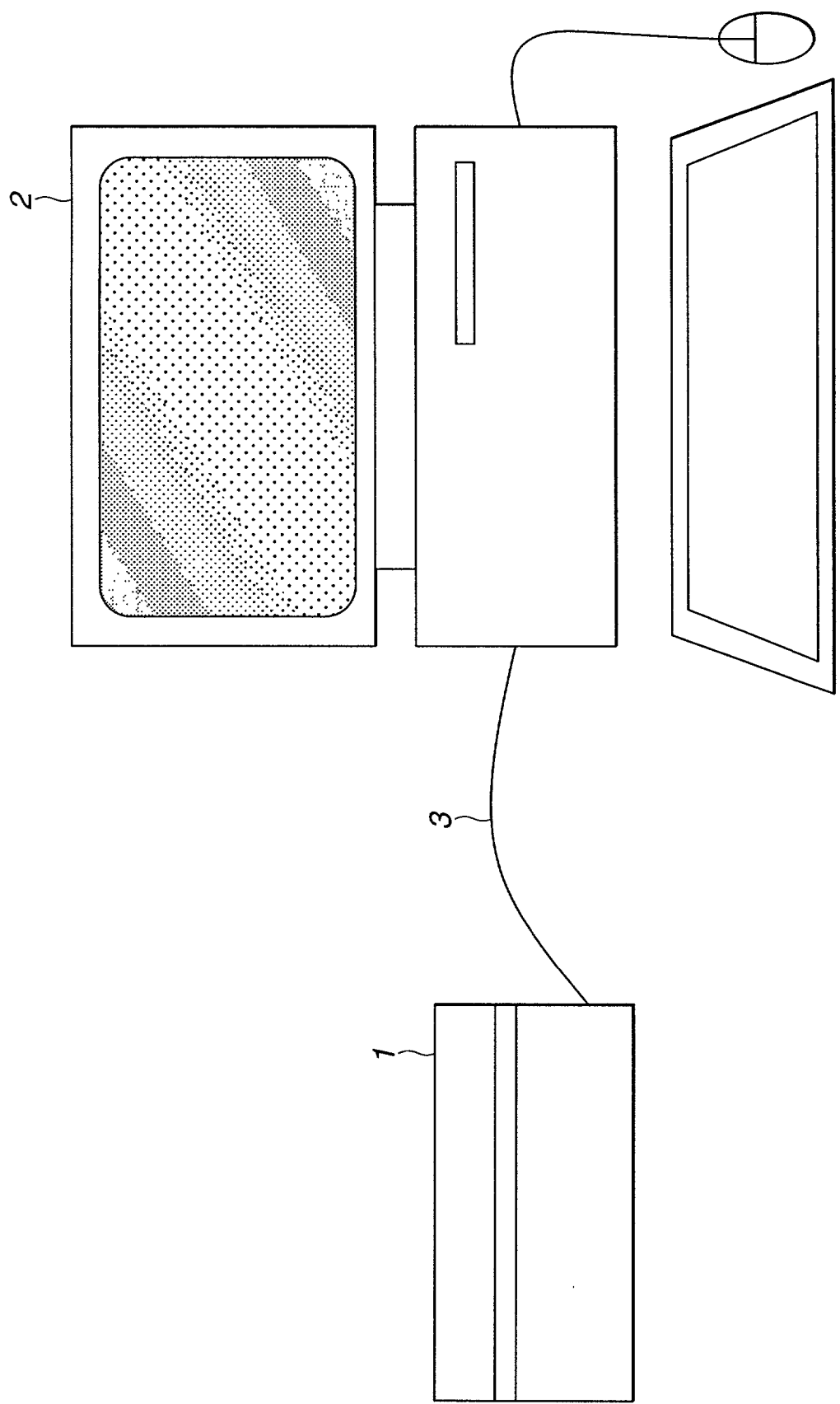
FIG. 2 is a diagram which shows one embodiment of an image processing system of the present invention.

The following is a detailed explanation, which is made with reference to the drawings, of the preferred embodiments of this invention. FIG. 2 shows one embodiment of an image processing system of the present invention. Image scanner 1 is an image input apparatus and a personal computer 2 processes image data input by image scanner 1. Cable 3 connects image scanner 1 and personal computer 2 and communicates the image data.

Figure 3:
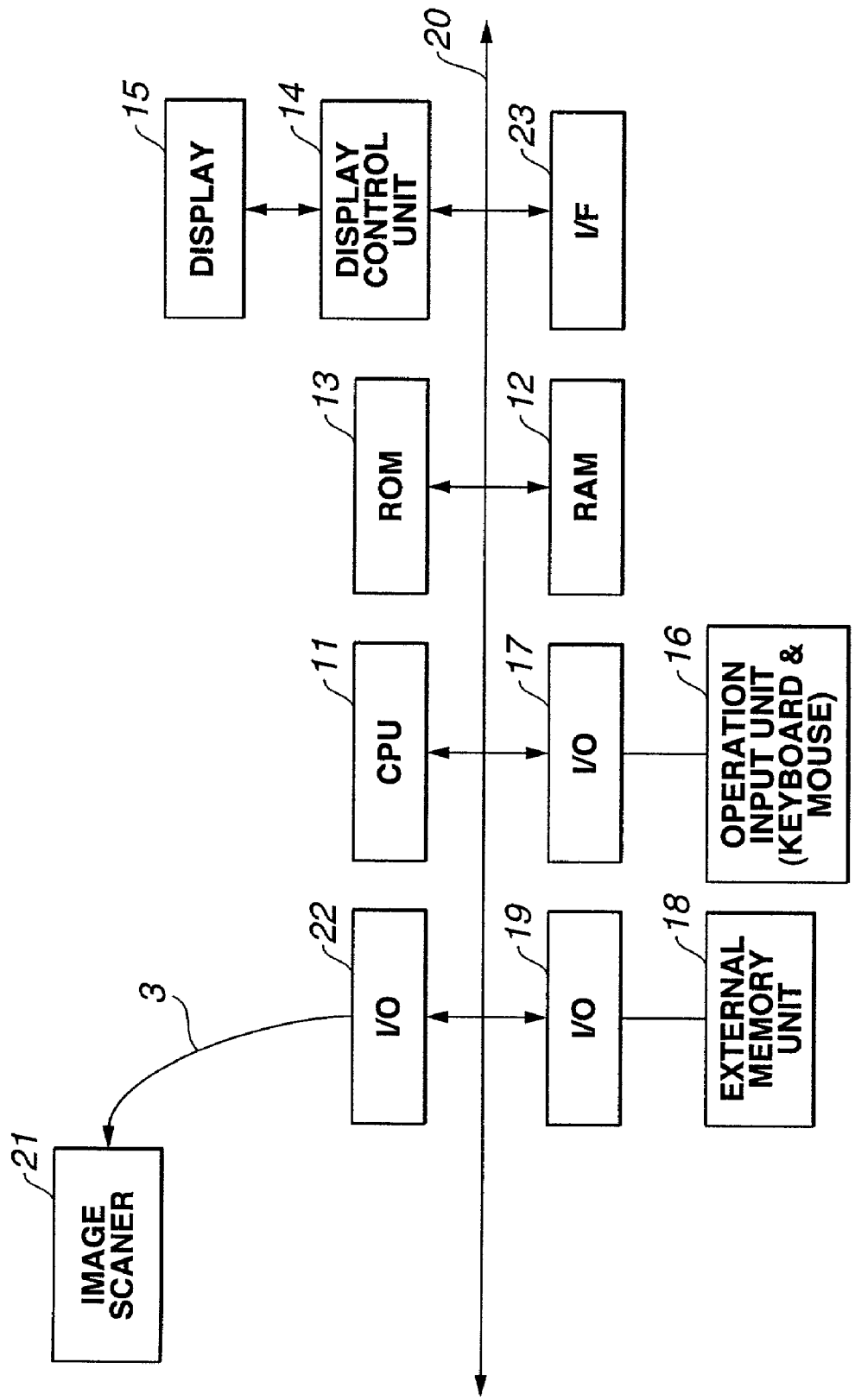
FIG. 3 is a block diagram that shows the main portion of FIG. 2.

FIG. 3 is a block diagram that shows the main portion of FIG. 2. CPU 11 is a central processing unit, RAM 12 is random access memory and ROM 13 is read only memory. Display control unit 14 controls display 15 and operation input unit 16 is a keyboard or a mouse. Connection I/O 17 is used for connecting operation input unit 16 to the image processing system. External memory unit 18 is a hard disk or a memory card etc. Connection I/O 19 is used for connecting external memory unit 18 to the image processing system. Bus 20 is used for communicating image data or other data. Image scanner 21 is the same as image scanner 1 in FIG. 2. Connection I/O 22 is used for receiving image data from image scanner 21 and sending control signals to image scanner 21. Interface unit 23 is a communication unit like a network.

Figure 4:
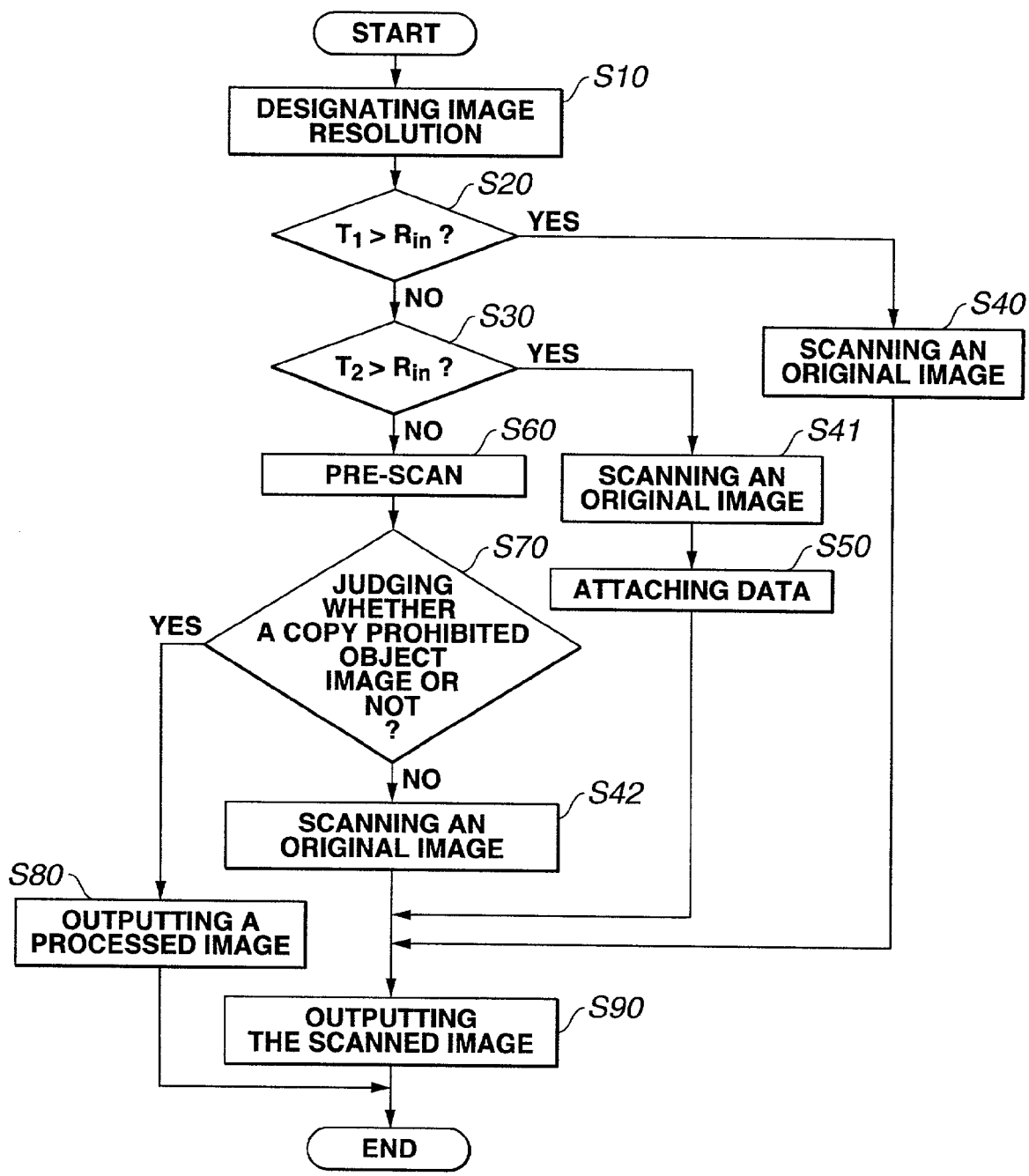
FIG. 4 is a flow chart which shows the process sequence by using the construction of FIG. 2 and FIG. 3.

FIG. 4 is a flow chart which shows a process sequence based on performing a process of the system shown in FIG. 2 and FIG. 3. A program that describes the process sequence of FIG. 4 is stored in ROM 13 in advance or in external memory unit 18 and then the program is moved into RAM 12.

CPU 11 executes the program to perform the process of this embodiment by software processes. The program is preferably a part of a scanner driver.

Reading image resolution, designated by the image system user, is stored in RAM 12 in step 10. In step 20, CPU 11 judges whether the designated image resolution {Rin} is less than a predetermined first standard resolution {T1}, e.g. 100 dpi [dot/inch]. This process is the first judgment. If the designated image resolution {Rin} is less than the predetermined first standard resolution {T1}, the process flows to step 40. On the other hand, if the designated image resolution {Rin} is as high as the predetermined first standard resolution {T1}, the process flows to step 30. As a result, a judgment of whether a scanned image is of a copy-prohibited object is not performed when the scanned image's resolution is less than a predetermined resolution since a printout of the scanned image is useless as a counterfeit. It is faster to print an image when the image resolution is less than the first standard density because the judgment of whether the object is copy-prohibited is not executed.

In step 30, CPU 11 judges whether the designated image resolution {Rin} is less than the predetermined second standard resolution {T2}, e.g. 300 dpi [dot/inch]. This judgment is a second judgment. If the designated image resolution {Rin} is less than the predetermined second standard resolution {T2}, the process flows to step 41. On the other hand, if the designated image resolution {Rin} is as high as the predetermined second standard resolution {T1}, the process flows to step 60. It can be expected that a counterfeiter who scans a copy-prohibited object designates high resolution scanning. Accordingly, judgment as to whether a scanned image is of a copy-prohibited object executes when the scanned image has a high resolution.

In step 40 or 41, CPU 11 judges that the image data of that image resolution is a low risk of counterfeiting and indicates, through the connection I/O 22, that the color image scanner 21 is scanning an original on the flatbed at the user's designated image resolution. The image scanner scans the original. The image data based on the original is sent and stored in RAM 12 through the connection I/O 12. After step 40, the process of FIG. 4 flows to step 90. After step 41, the process of FIG. 4 flows to step 50.

In step 50, the image resolution is not high enough and is not suitable for inputting a vivid copy-prohibited object, but CPU 11 takes measures to prevent a counterfeit of the copy-prohibited object by way of caution. Specifically, CPU 11 attaches the product number of personal computer 2 or color image scanner 1 and the user ID information to the image stored in RAM 12. The attached information is registered when a driver of the color image scanner 1 is installed. If the image stored in RAM 12 is printed or is output to an external apparatus through a network, it is thus possible to identify the person or apparatus that scanned the copy-prohibited object by using the attached information. The attachment is performed by the technology of digital watermark. After step 50, the process of FIG. 4 flows to step 90.

In step 60, since there is a possibility of inputting the copy-prohibited object as a vivid image, CPU 11 judges that image data of that image resolution has a high risk of counterfeiting and performs extraction of digital watermark data attached to the copy-prohibited object from the image stored in RAM 12. CPU 11 indicates, through connection I/O 22, to color image scanner 21 to scan an original on the flatbed at a lower image resolution than the user's designated one. Color image scanner 21 scans the original at the lower image resolution. The image data generated by the scanning is sent to RAM 12 through the connection I/O 22. This scanning is carried out by using a well-known function of a color image scanner driver. After step 60, the process of FIG. 4 flows to step 70.

In step 70, CPU 11 judges whether the lower resolution image data generated by the scanning is of a copy-prohibited object or not. If CPU 11 judges that the lower resolution image data belongs to a copy-prohibited object, the process flows to step 80. On the other hand, if CPU 11 judges that the lower resolution image data is not of a copy-prohibited object, the next process is step 42. Step 42 is the same as step 40 or 41, and the process flows thereafter to step 90.

In Step 80, the lower resolution image data generated by the scanning is output as a processed image. Specifically, the lower resolution image data generated by the scanning is output 1) after converting color or changing image size, and/or 2) after attaching any symbol or figure as a processed image. The processed image is not equal to the scanned image data.

It is easy to make the processed image from the image stored in RAM 12 by using a well-known image processing program module corresponding to 1) and 2) under CPU 11's control. The processed image is output to external memory unit 18 as an image data file through the connection I/O 19. The process terminates when step 80 has finished.

In step 90, the image data scanned in step 42 is output to external memory unit 18 as an image file through the connection I/O 19, when CPU 11 judges that the lower resolution image data generated by the scanning is not of a copy-prohibited object. The process terminates when step 90 has finished.

The original as a print document, which is made from the digital image data with attached information indicating that the object is copy-prohibited as a digital watermark, is scanned by color image scanner 21. The judgment of whether the object is copy-prohibited in step 80 is performed by extracting the digital watermark from the scanned image data.

In step 80, it is possible to select another process in which the image data generated by the scanned image is not output at all. As a result, the image of the copy-prohibited object cannot be input in the first place. Of course, it may be good to give warning indicating that the original is copy-prohibited. The warning is displayed on the display 15 through display control unit 14. The warning has the advantage of stopping mischief and preventing the mistake of using a copy-prohibited object for the original.

It is possible to prevent a counterfeiter from reading a copy-prohibited object by high image resolution. Additionally, a process speed of this embodiment's image processing system which judges whether an object is copy-prohibited by using software and a CPU is faster because a judgment of whether the object is copy-prohibited is not performed for an image read with low image resolution. This embodiment's image processing system does not judge an image read with middle range resolution because a possibility of reading a copy-prohibited object is not high enough, and then the middle range resolution image is attached with information. It is thus possible to stop the software judgment from consuming too much time.

Second Embodiment

The judgment of whether an object is copy-prohibited, in step 70 of the first embodiment, is performed using photo electrical converted image data generated from a print object's added information, using digital water mark, to indicate whether the object is copy-prohibited.

For the judgment of whether an object is copy-prohibited, in step 70, it is possible to use another method. For example, an original may be judged based on a color spectrum distribution based on image data (R,G,B data for each pixel) generated by scanning the original and a comparison of the color spectrum distribution with copy-prohibited object data stored in a ROM or a comparison of an image pattern of a part of the original (or the entire original) with a copy-prohibited object pattern stored in a ROM. The result of the judging is an evaluation value as to whether the original is a copy-prohibited object or not.

In this case, the evaluation value (e.g., the sum of the absolute value of the comparing result or the correlation between the image data (pattern) and data (pattern) stored in a ROM) is judged on the basis of a predetermined threshold. If the sum of the absolute value of the comparing result is not over the predetermined threshold, the original is judged to be a copy-prohibited object. If the sum of the absolute value of the comparing result is over the predetermined threshold, the original is not judged to be a copy-prohibited object. If the correlation is over the predetermined threshold, the original is judged to be a copy-prohibited object. If the correlation is not over the predetermined threshold, the original is not judged to be a copy-prohibited object.

Third Embodiment

Figure 5:
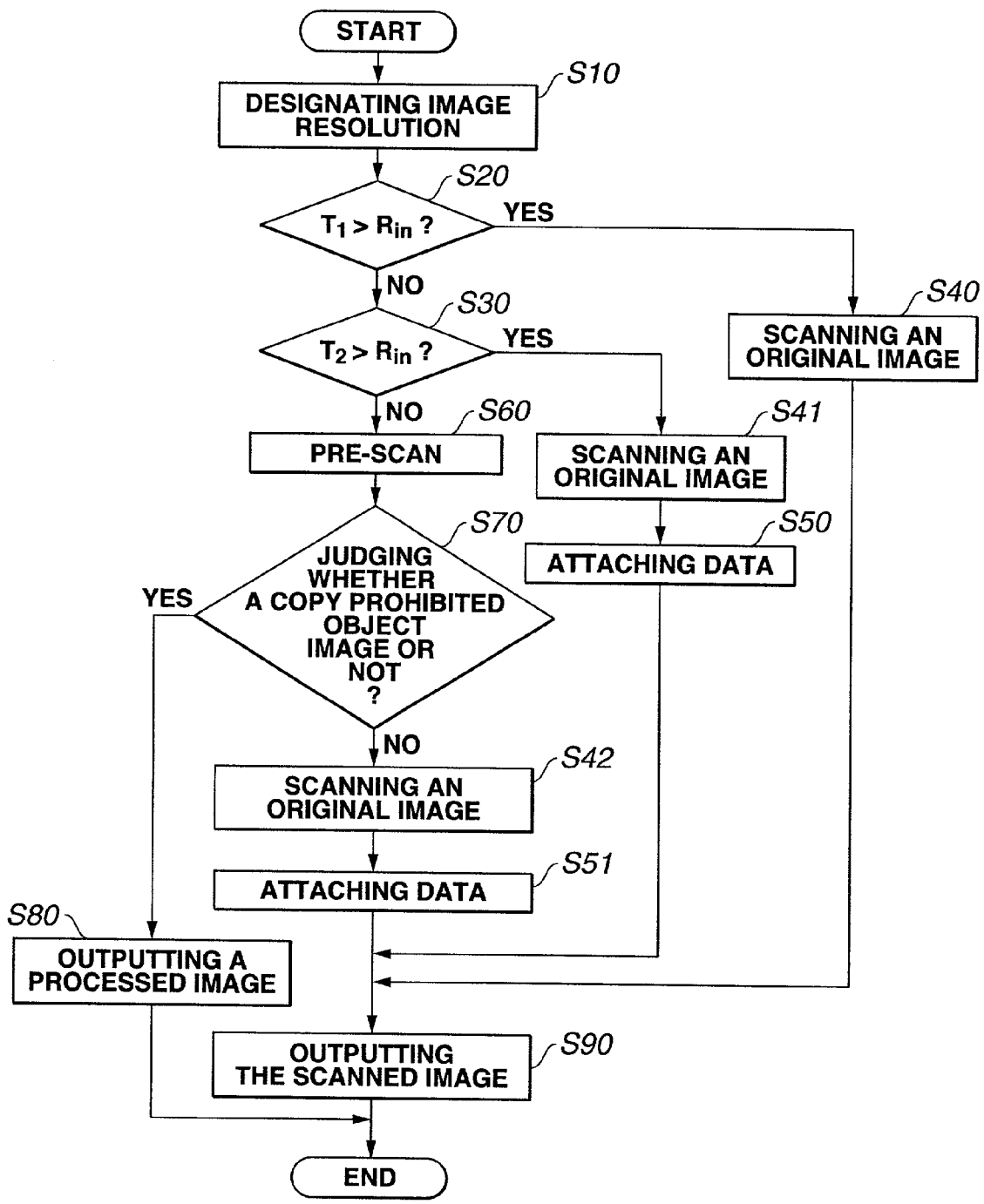
FIG. 5 is a flow chart which shows the process sequence of a third embodiment.

In the first embodiment and second embodiment, if an original is not judged as a copy-prohibited object, the original image is output without information attached to the original image. It is possible to attach information to the original image in step 51, which is the same as step 50 and performed after step 42. A flowchart of this process is shown in FIG. 5. FIG. 5 and FIG. 4 are the same except for step 51.

Fourth Embodiment

In step 30 of the first, second and third embodiments, if the user-designated image resolution is less than the predetermined second standard resolution, the specific data is attached to the image data in step 50. It is possible to replace step 50 with step 71, which is the same as step 70, or to perform both step 50 and step 71.

Figure 6:
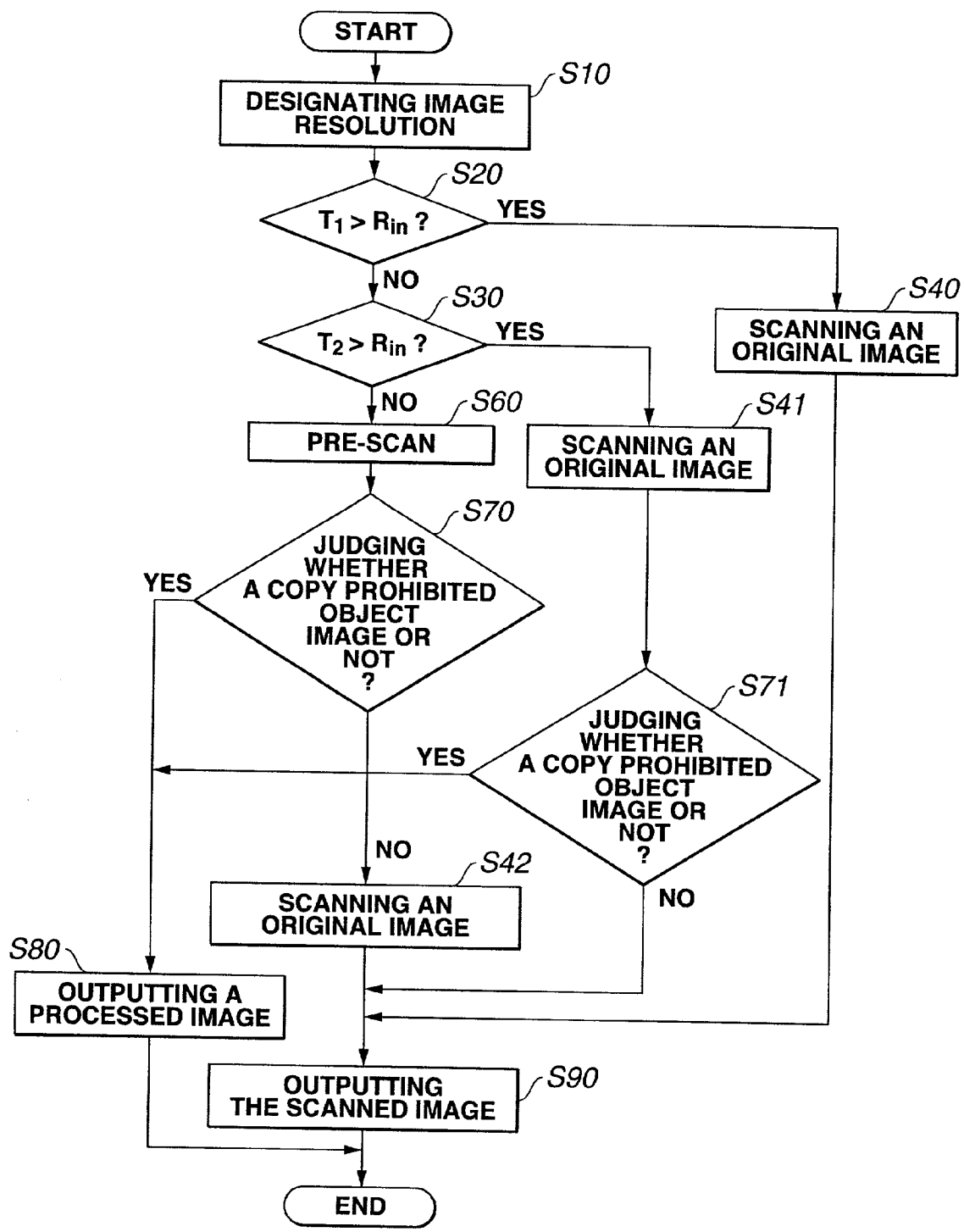
FIG. 6 is a flow chart which shows a modification of the process sequence of FIG. 4.

FIG. 6 is a flowchart which performs the first above-mentioned change to FIG. 4. In step 71, after reading an image in step 41, a judgment of whether an object is copy-prohibited is performed. If CPU 11 judges that the image is of a copy-prohibited object, the process flows to step 80. On the other hand, if CPU 11 judges that the image is not of a copy-prohibited object, the process flows to step 90. The rest of the steps in FIG. 6 are the same as in FIG. 4.

Figure 7:
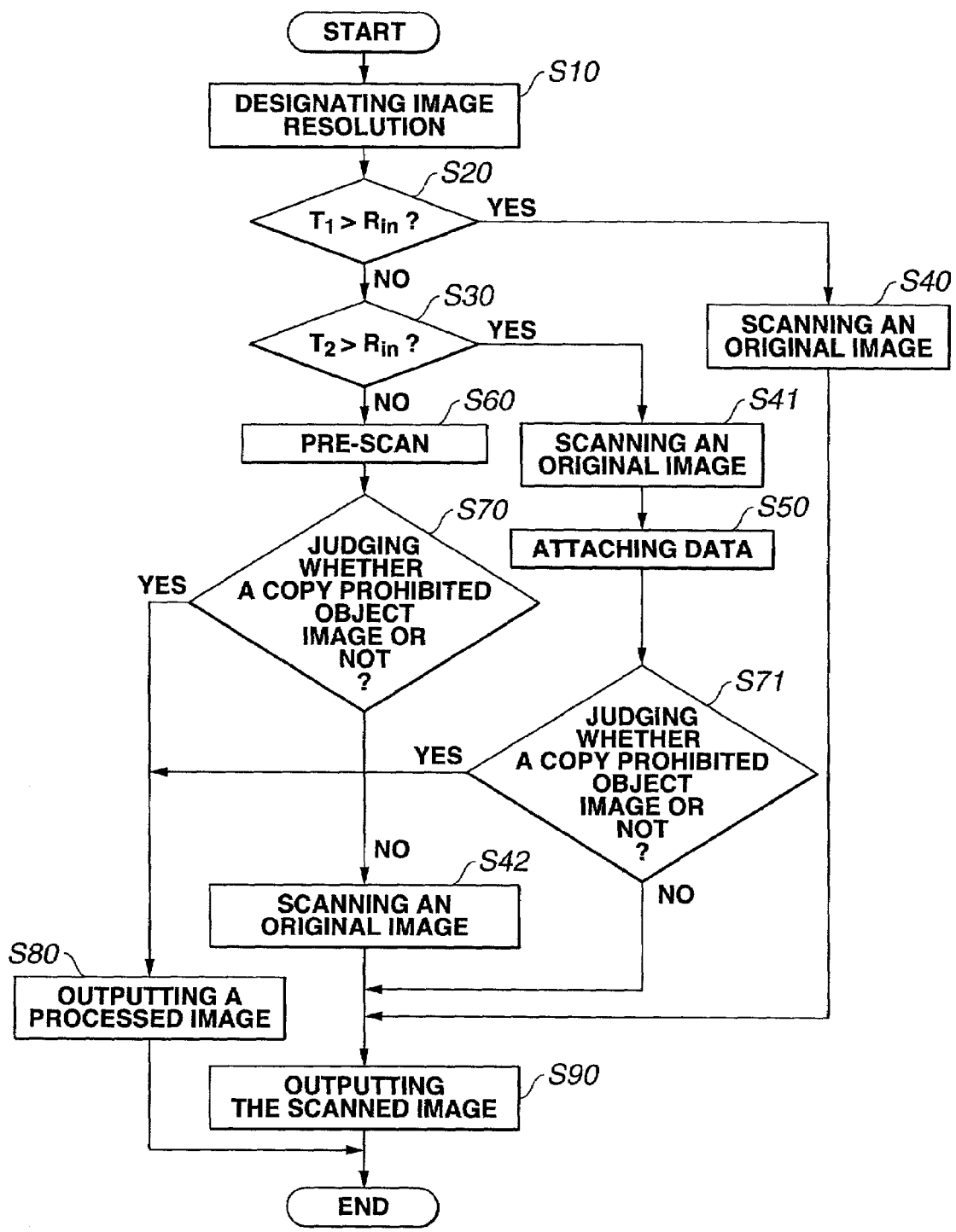
FIG. 7 is a flow chart which shows a modification of the process sequence of FIG. 4.

FIG. 7 is a flowchart which performs the other change mentioned above for FIG. 4. In step 71, after being attached with data in step 50, a judgment of whether the object is copy-prohibited is performed like in step 70. If CPU 11 judges that a read image is of a copy-prohibited object, the process flows to step 80. On the other hand, if CPU 11 judges that the image is not of a copy-prohibited object, the process flows to step 90. It is possible to reduce process speed by not first reading the image at low resolution, because the image resolution is already somewhat lower to begin with in this case. The rest of the steps in FIG. 7 are the same as FIG. 4.

Figure 8:
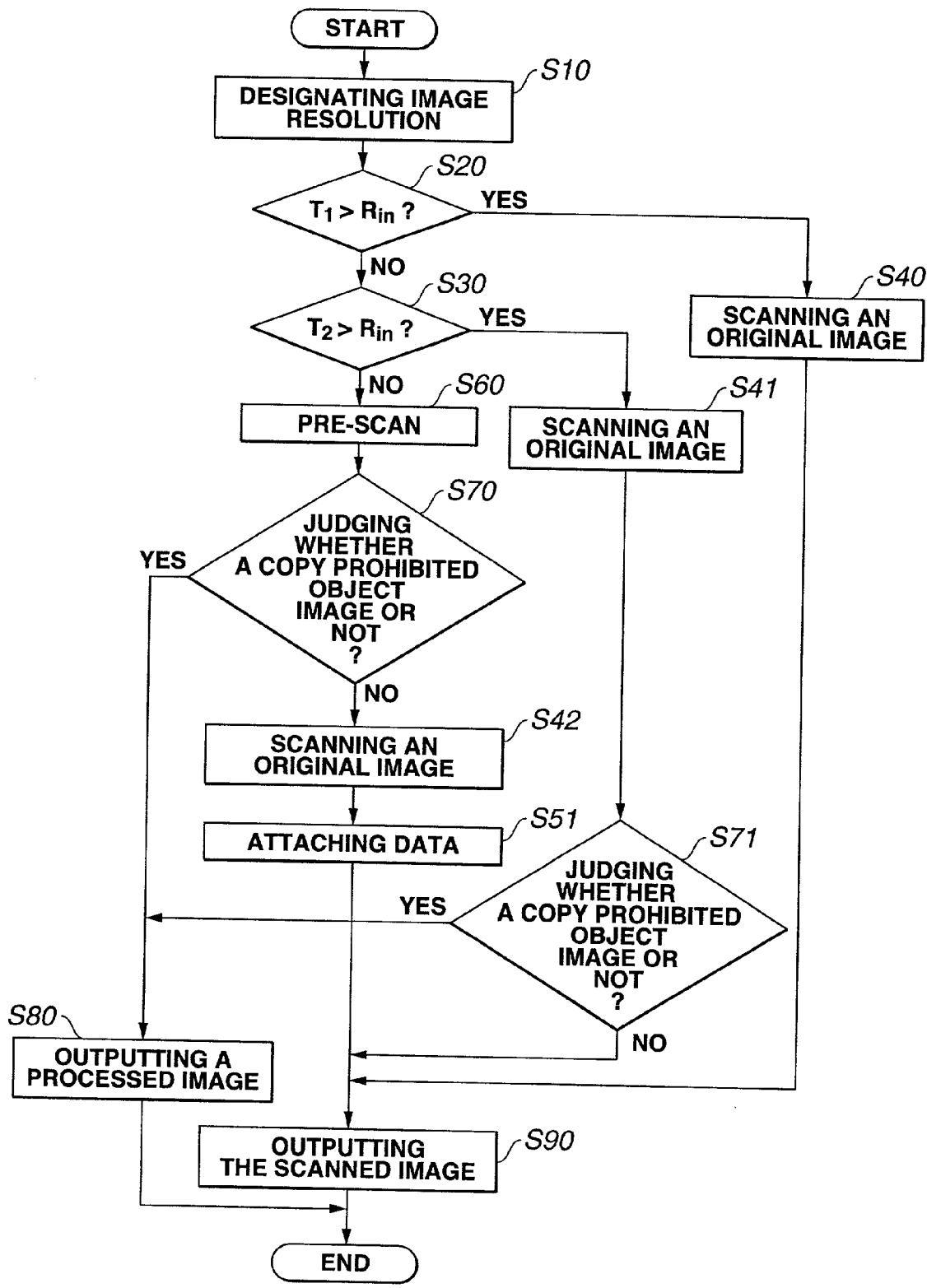
FIG. 8 is a flow chart which shows a modification of the process sequence of FIG. 5.

FIG. 8 is a flowchart which performs the first above-mentioned change to FIG. 5. In step 71, after reading an image in step 41, a judgment of whether an object is copy-prohibited is performed. If CPU 11 judges that the image is of a copy-prohibited object, the next process is step 80. On the other hand, if CPU 11 judges that the image is not of a copy-prohibited object, the process flows to step 90. The rest of the steps in FIG. 8 are the same as in FIG. 5.

Figure 9:
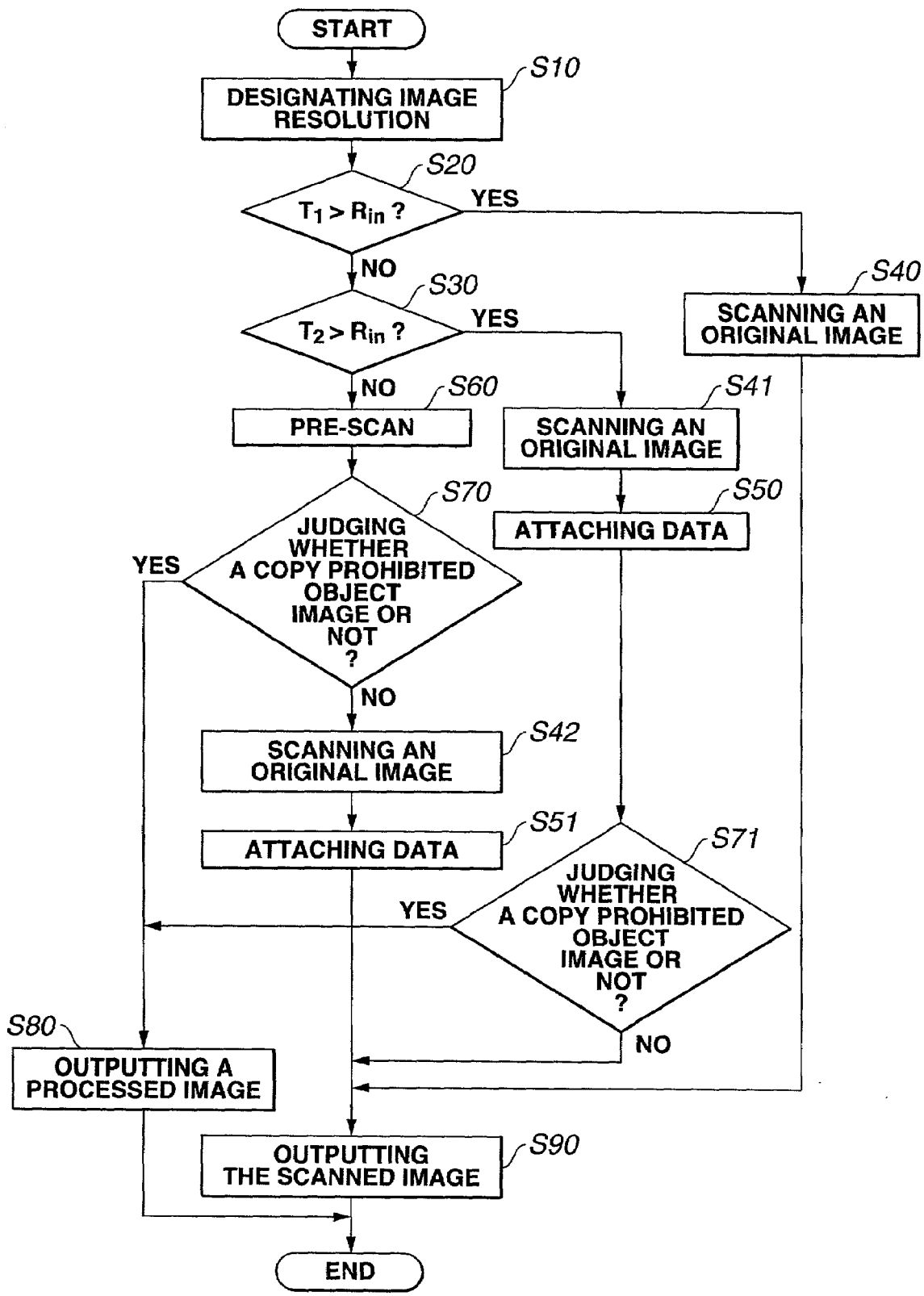
FIG. 9 is a flow chart which shows a modification of the process sequence of FIG. 5.

FIG. 9 is a flowchart which performs the other above-mentioned change to FIG. 5. In step 71, after being attached with data in step 50, a judgment of whether the object is copy-prohibited is performed like in step 70. If CPU 11 judges that a read image is of a copy-prohibited object, the process flows to step 80. On the other hand, if CPU 11 judges that the image is not of a copy-prohibited object, the process flows to step 90. The rest of the steps in FIG. 9 are the same as in FIG. 5.

Fifth Embodiment

The above-mentioned process of attaching data or judging whether an object is copy-prohibited is performed for color scanned image data based on user-designated image resolution. The process is not only performed for the color scanned image data, but also for other input image data. The other image input data is input from interface unit 23 shown in FIG. 3 as communication means like a network or a detachable storage medium (e.g., smart media, compact flash, magnetic optical disk) which is connected to a un-shown drive unit of the image process system in FIG. 3 and stores color image data. The attached information, in step 50, is the network address of the sender apparatus that sent the image data through interface unit 23 or the number of the detachable memory.

The above-mentioned judging program for determining if an object is copy-prohibited is included in a communication program (ex. Internet browser soft ware) or a program for obtaining image data from a storage medium.

CPU 11 controls the input image resolution information of stored image data in step 10 in this case. Image data stored on the detachable memory being attached to the un-shown drive unit is read through an I/O unit, which is connected the drive unit of the detachable memory. The image resolution information in step 10 and the image data in steps 40, 41 and 42 may be input through an interface unit connected to a network like the Internet.

Sixth Embodiment

Image data including the processed image data and the scanned image data is output as an image data file to external memory unit 18 (a hard disk of this image processing system) through the connection I/O 19. However, image data may be output to a color printer or an external apparatus through a network and an interface unit. In this case, the information attached in step 50 is a product number or a network address of a send side apparatus or a receive side apparatus. In this embodiment, a copy-prohibited object judging program includes a program for using communication through a network or printer driver.

Figure 10:
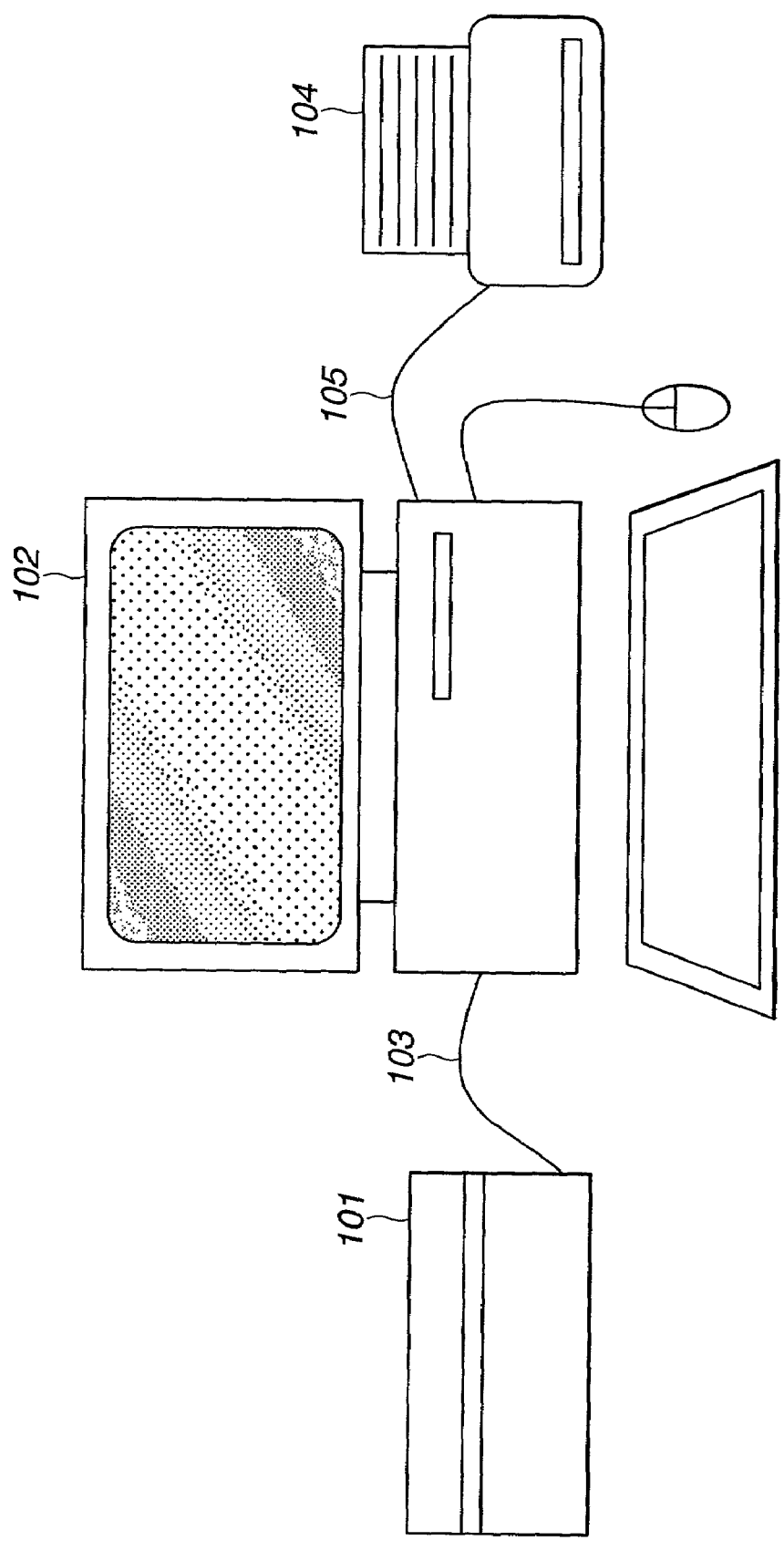
FIG. 10 is a diagram which shows a sixth embodiment of the image processing system of the present invention.

FIG. 10 indicates an example of an image processing system of this embodiment. Image scanner 101 is an image input apparatus and a personal computer 102 processes image data and outputs processed image data to color printer 104 as an output apparatus.

Figure 11:
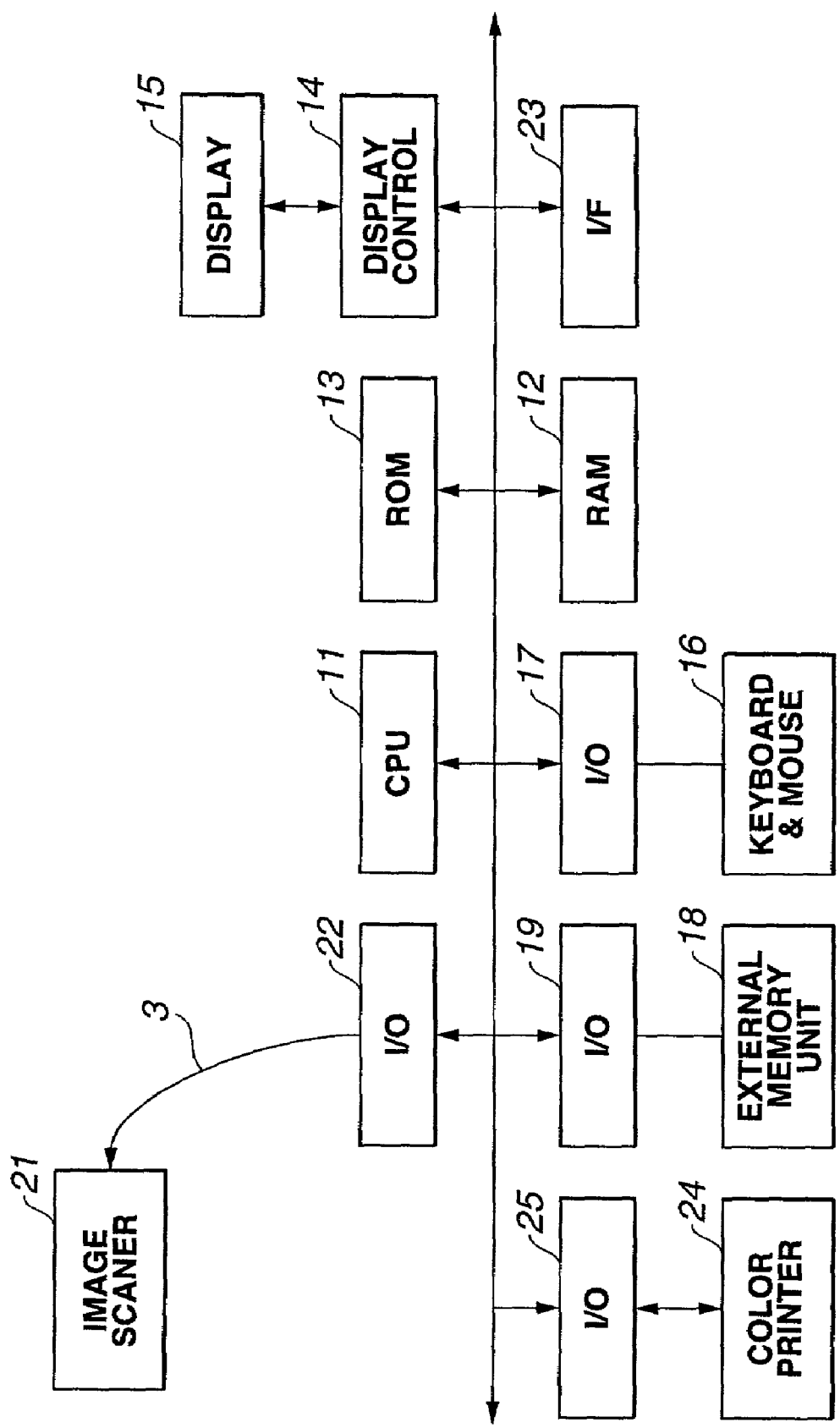
FIG. 11 is a block diagram that shows the main portion of FIG. 10.

FIG. 11 is a block diagram that shows the main portion of FIG. 10. Connection I/O 25 connects to an image output apparatus like a color printer. Other components of FIG. 11 are the same as in FIG. 3. In this case, image output in steps 80 and 90 in FIGS. 4, 5, 6, 7, 8 and 9 is replaced with image output to a color printer 24 connected through I/O 25. Image data in steps 80, 90 may be output through an interface unit connected to a network like the Internet.

Seventh Embodiment

When the color printer outputs an object image in the sixth embodiment, information is attached to the object image by using the digital watermark method in step 50 and step 51. However, it is possible to attach information like a serial number in a printed image as unknown color information for an image processing system user.

OTHER EMBODIMENTS

The object of the present invention can also be achieved by providing a storage medium that stores program codes for performing the aforesaid processes to a system or an apparatus, reading the program codes with a computer (e.g., CPU, MPU) of the system or apparatus from the storage medium, and then executing the program.

In this case, the program codes read from the storage medium realize the functions according to the above-mentioned embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (Operating System) or the like working on the computer performs a part or entire processes in accordance with designations of the program codes and realizes functions according to the above embodiments.

The image processing system judges a risk of a read image being used as a forgery based on a user's indicated image reading resolution and reduces a process time for prohibiting forgery which is usually performed for every image even when there is little risk.

As a result, a process using software for prohibiting forgery is efficient and it is possible to increase the overall process speed of the image processing system.

What is claimed is:

1. An image processing apparatus comprising:
   comparing means for comparing image resolution of input image data and information of a predetermined standard resolution;
   judging means for judging whether the image data includes specific information related to copy protection; and
   controlling means for controlling whether said judging means performs the judging based on the result of the comparing by said comparing means.

2. An image processing apparatus according to claim 1, wherein said judging means comprises means for performing the judging using a software process.

3. An image processing apparatus according to claim 1, wherein said specific information comprises a digital watermark.

4. An image processing apparatus according to claim 1 further comprising, checking means for determining if the input image data is a copy-prohibited object based on a result of the judging by said judging means in the case where the resolution of the input image data is at least as large as a predetermined standard resolution.

5. An image processing apparatus according to claim 4, wherein said image data is output as processed image data based on a result from said checking means; and
   wherein said processed image data is not equal to said input image data.

6. An image processing apparatus according to claim 5, wherein a destination of the output image data is a storage media or a printer or a network.

7. An image processing apparatus according to claim 5, wherein output of the image data is prevented based on a result from said checking means.

8. An image processing apparatus according to claim 1, wherein said control means determines that said judging means should not initiate judging when the resolution of said input image data is at least as large as a predetermined standard resolution.

9. An image processing apparatus according to claim 1, wherein in a case where information is attached to said input image data said controlling means controls said judging means not to perform judging when the resolution of said input image data is greater than a a first predetermined standard resolution and less than a second predetermined standard resolution.

10. An image processing apparatus according to claim 9, wherein said information is a product number of a personal computer or a product number of a scanner which is a part of the image process apparatus or a user's ID information.

11. An image processing apparatus according to claim 9, wherein said information is attached to the image data as a digital watermark or by non-visible color information.

12. An image processing apparatus according to claim 9, wherein said information is attached to the input image data in the case when said input image is not a copy-prohibited object.

13. An image processing apparatus according to claim 1, wherein the judging by said judging means is performed using image data having a resolution less than said predetermined standard resolution.

14. An image processing apparatus according to claim 1, wherein said specific information is a color spectrum distribution or an image pattern.

15. An image processing apparatus according to claim 1, wherein said control means controls said judging means to perform judging when resolution of said input image data is greater than a first predetermined standard resolution and less than a second predetermined standard resolution.

16. An image processing apparatus according to claim 1, wherein said input image data is input from a scanner or a storage media or a network.

17. An image processing apparatus according to claim 16, wherein information specifying a particular storage media is attached to said input image data when said input image data is input from the particular storage medium; and
   wherein information specifying a network address of a sender of said input image data and/or a network address of a receiver of said input image data is attached to said input image data when said input image data is received from a network.

18. An image processing method comprising:
   comparing image resolution of input image data and information of a predetermined standard resolution;
   judging whether the image data includes specific information relating to copy protection; and
   determining whether said judging step should be initiated based on the results of said comparing step.

19. An image processing method according to claim 18, wherein the judging process is performed by a software process.

20. An image processing method comprising according to claim 18, wherein said specific information comprises a digital watermark.

21. An image processing method according to claim 18 further comprising, checking whether said input image data is a copy-prohibited object based on a result of said judging step in the case where the resolution of said input image data is at least as large as the predetermined standard resolution.

22. An image processing method according to claim 21, wherein said image data is output as processed image data based on a result of said checking step;
   wherein said processed image data is not equal to said input image data.

23. An image processing method according to claim 22, wherein a destination of the output image data is a storage media or a printer or a network.

24. An image processing method according to claim 22, wherein output of said image data is prevented based on a result of said checking step.

25. An image processing method according to claim 22, wherein information is attached to said input image data in the case where said input image is not a copy-prohibited object.

26. An image processing method according to claim 18, wherein said image processing method determines that the judging should not be initiated when resolution of said input image data is at least as large as the predetermined standard resolution.

27. An image processing method according to claim 18, wherein in a case where information is attached to said input image data judging is not performed when resolution of said input image data is at least as large as a first predetermined standard resolution and is less than a second predetermined standard resolution.

28. An image processing method according to claim 27, wherein said information is a product number of a personal computer or a product number of a scanner which is a part of an image processing apparatus performing said image processing method or a user's ID information.

29. An image processing method according to claim 27, wherein the information is attached to the input image data as a digital watermark or non-visible color information.

30. An image processing method according to claim 18, wherein the judging is performed using image data having an image resolution less than said predetermined standard image resolution.

31. An image processing method according to claim 18, wherein said specific information is a color spectrum distribution or an image pattern.

32. An image processing method according to claim 31, wherein information specifying a particular storage media is attached to said input image data when said input image data is input from the particular storage media; and
wherein information specifying a network address of a sender of said input image data and/or a network address of a receiver of said input image data is attached to said input image data when said input image data is received from a network.

33. An image processing method according to claim 18, wherein said input image data is input from a scanner or a storage media or a network.

34. An image processing method according to claim 18, wherein said judging is initiated when resolution of said input image data is at least as large as a first predetermined standard resolution and is less than a second predetermined standard resolution.

35. A computer program product, comprising a computer readable medium having computer program codes, for executing image processing, said product including:
comparing process procedure codes for comparing image resolution of input image data and information of a predetermined standard resolution;
judging process procedure codes for judging whether the image data includes specific information relating to copy protection; and
controlling process procedure codes for controlling whether the judging should be initiated based on the result of the comparing.

36. An image processing apparatus comprising:
generating means for generating image resolution information for input image data;
first comparing means for comparing said generated image resolution information with a first predetermined standard resolution;
second comparing means for comparing said generated image resolution information with a second predetermined standard resolution;
data adding means for adding data to said input image data; and
judging means for judging whether or not said input image data includes specific information;
wherein said data adding means is controlled to perform the adding based on an output of said first comparing means and said judging means is controlled to perform the judging based on an output of said second comparing means.

37. An image processing apparatus according to claim 36, wherein said first comparing means determines that the input image data has a low risk of counterfeiting in the case where image resolution of said input image is less than said first predetermined standard resolution.

38. An image processing apparatus according to claim 36, wherein said second comparing means determines that the image data has a high risk of counterfeiting in the case where image resolution of said input image is at least as large as said second predetermined standard resolution and processing by both said data adding means and said judging means is performed.

39. An image processing apparatus according to claim 36, wherein said second comparing means determines that the input image data does not have a low risk of counterfeiting in the case where image resolution of said input image is at least as large as said second predetermined standard resolution and processing by one of said data adding means and said judging means is performed.

40. An image processing apparatus according to claim 39, wherein said second comparing means determines that the input image data does not have a low risk of counterfeiting in the case where image resolution of said input image is at least as large as said second predetermined standard resolution and processing by both of said data adding means and said judging means is performed.

41. An image processing apparatus according to claim 36, wherein said judging means also judges whether or not a copy-prohibited object image is included in said input image data.

42. An image processing apparatus according to claim 36, wherein said judging means also judges whether or not a predetermined digital watermark is attached to said image data.

43. An image processing apparatus according to claim 36 further comprising output means for outputting a result of said judging means,
wherein said output means outputs a signal indicating that said image data includes said specific information when said judging means judges that image data inputted using input means includes specific information.

44. An image processing method comprising:
a generating step for generating image resolution information for input image data;
a first comparing step for comparing said generated image resolution information with a first predetermined standard resolution;
a second comparing step for comparing said generated image resolution information with a second predetermined standard resolution;
a data adding step for adding data to said input image data; and
a judging step for judging whether or not said input image data includes specific information;
wherein said data adding step is controlled to perform adding based on a result of said first comparing step and said judging step is controlled to perform judging based on a result of said second comparing step.

45. An image processing method according to claim 44, wherein said first comparing step determines that the input image data has a low risk of counterfeiting in the case where image resolution of said input image is less than said first predetermined standard resolution.

46. An image processing method according to claim 44, wherein said second comparing step determines that the image data has a high risk of counterfeiting in the case where image resolution of said input image is at least as large as said second predetermined standard resolution and processing by both said data adding step and said judging step is performed.

47. An image processing method according to claim 44, wherein said second comparing step determines that the input image data does not have a low risk of counterfeiting in the case where image resolution of said input image is at least as large as said second predetermined standard resolution and processing by one of said data adding step and said judging step is performed.

48. An image processing method according to claim 47, wherein said second comparing step determines that the input image data does not have a low risk of counterfeiting in the case where image resolution of said input image is at least as large as said second predetermined standard resolution and processing by both of said data adding step and said judging step is performed.

49. An image processing method according to claim 44, wherein said judging step also judges whether or not a copy-prohibited object image is included in said input image data.

50. An image processing method according to claim 44, wherein said judging step also judges whether or not a predetermined digital watermark is included in said image data.

51. An image processing method according to claim 44 further comprising an output step for outputting a result of said judging step;
    wherein said output step outputs a signal indicating that said image data includes said specific information in the case where said judging step judges that said image data includes specific information.

52. A computer program product, comprising a computer readable medium having computer program codes, for executing image processing, said product including:
    generating procedure codes for generating image resolution information of input image data;
    first comparing procedure codes for comparing said generated image resolution information with a first predetermined standard resolution;
    second comparing procedure codes for comparing said generated image resolution information with a second predetermined standard resolution;
    data adding procedure codes for adding data to said input image data; and
    judging procedure codes for judging whether or not said input image data includes specific information;
    wherein said data adding is controlled to perform adding based on a result of comparing by said first comparing procedure codes and said judging is controlled to perform judging based on a result of comparing by said second comparing procedure codes.

* * * * *

UNITED STATES PATENT AND TRADEMARK OFFICE
CERTIFICATE OF CORRECTION

PATENT NO. : 7,035,426 B2
APPLICATION NO. : 09/774040
DATED : April 25, 2006
INVENTOR(S) : Hiromitsu Nishikawa et al.

It is certified that error appears in the above-identified patent and that said Letters Patent is hereby corrected as shown below:

TITLE PAGE [30]:
Foreign Application Priority Data, "2000/021560" should read --2000-021560--.

TITLE PAGE [57] ABSTRACT:
Line 9, "c" should be deleted.

COLUMN 1:
Line 37, "original(or" should read --original (or--.

COLUMN 4:
Line 23, close up right margin.
Line 24, close up left margin.

COLUMN 7:
Line 57, "soft ware)" should read --software)--.

COLUMN 9:
Line 21, "claim 1" should read --claim 1,--.
Line 34, "media" should read --medium--.

COLUMN 10:
Line 8, "media" should read --medium--.
Line 10, "media" should read --medium--.
Line 28, "comprising" should be deleted.
Line 31, "claim 18" should read --claim 18,--.
Line 32, "comprising," should read --comprising:--.
Line 43, "media" should read --medium--.

COLUMN 11:
Line 12, "media" should read --medium--.
Line 14, "media;" should read --medium;--.
Line 22, "media" should read --medium--.

UNITED STATES PATENT AND TRADEMARK OFFICE
CERTIFICATE OF CORRECTION

PATENT NO. : 7,035,426 B2
APPLICATION NO. : 09/774040
DATED : April 25, 2006
INVENTOR(S) : Hiromitsu Nishikawa et al.

It is certified that error appears in the above-identified patent and that said Letters Patent is hereby corrected as shown below:

COLUMN 12:
Line 26, "claim 36" should read --claim 36,--.

Signed and Sealed this

Second Day of January, 2007

JON W. DUDAS
*Director of the United States Patent and Trademark Office*